United States Patent [19]

Sever

[11] 4,116,308

[45] Sep. 26, 1978

[54] ELECTROMAGNETICALLY OPERATED FRICTION BRAKE

[75] Inventor: Janez F. Sever, Mequon, Wis.

[73] Assignee: Square D Company, Park Ridge, Ill.

[21] Appl. No.: 796,582

[22] Filed: May 13, 1977

Related U.S. Application Data

[63] Continuation-in-part of Ser. No. 737,802, Nov. 1, 1976, abandoned.

[51] Int. Cl.² .............................................. B60T 13/04
[52] U.S. Cl. ..................................... 188/171; 188/75; 188/196 BA
[58] Field of Search ................... 188/75, 171, 196 BA

[56] References Cited

U.S. PATENT DOCUMENTS

| 2,889,014 | 6/1959 | Goetz | 188/171 |
| 3,028,934 | 4/1962 | Lister | 188/171 |
| 3,115,956 | 12/1963 | Trombetta | 188/75 X |
| 3,356,190 | 12/1967 | Prussak | 188/171 |

FOREIGN PATENT DOCUMENTS

2,447,172 7/1975 Fed. Rep. of Germany ............ 188/75

Primary Examiner—Duane A. Reger
Attorney, Agent, or Firm—William H. Schmeling; Richard T. Guttman

[57] ABSTRACT

An industrial type friction brake having a pair of brake shoes engageable with opposite sides of a brake drum. The brake has levers and pivots arranged to automatically cause the brake shoes to simultaneously engage the brake drum and maintain the distance the brake shoes move constant to compensate for misalignment of the brake shoes and wear of the brake linings. The components of the brake are arranged so that all adjustable components are located at the top of the brake and the magnet coil or brake shoes may be removed for replacement purposes without disturbing any of the levers of the brake. Additionally, the brake is provided wth means to minimize the possibility of injury to persons during replacement of the brake drum and includes an inexpensive manually operable means to manually release the brake shoes from their engagement with the brake drum.

15 Claims, 8 Drawing Figures

ELECTROMAGNETICALLY OPERATED FRICTION BRAKE

This invention relates to a brake in which a pair of brake shoes having arcuate friction surfaces are engaged and disengaged from a brake drum selectively, and more particularly to a brake that has its components, including its levers and pivots for the levers, arranged to automatically compensate for misalignments of the brake shoes and lining wear of the brake shoes and is a continuation in part of Ser. No. 737,802, filed Nov. 1, 1976, now abandoned.

Friction brakes of the type to which the present invention relates are frequently used in industrial environments, such as steel mills, to control the movement of travelling cranes as well as the hoisting apparatus of the crane. This type of service dictates that the brakes must be capable of providing reliable service and be easy to adjust and maintain. The brake according to the present invention is preferably assembled of fabricated rather than cast parts and includes a means for automatically positioning a pair of brake shoes of the brake relative to a brake drum so the shoes simultaneously engage the drum to compensate for any initial misalignment of the brake shoes and to maintain the distance moved by the shoes constant to compensate for wear of the linings of the brake shoes.

It is an object of the present invention to provide an industrial type friction brake structure which may be assembled of fabricated metal parts and includes an arrangement which will automatically position and maintain a pair of brake shoes for proper engagement with a brake drum.

Another object is to provide a friction brake structure with an arrangement of levers and pivots which will automatically position and maintain the position of a pair of brake shoes relative to a brake drum to compensate for any misalignment between the shoes and drum and wear of the linings of the brake shoes.

An additional object is to provide a friction brake of the electromechanically operated type which will permit the magnet coil of the brake to be replaced without requiring the release of the frictional engagement between the brake shoes and the brake drum components of the brake.

A further object is to provide an industrial type friction brake wherein all components requiring adjustment are easily accessible and located at the top of the brake.

Further objects and features of the invention will be readily apparent to those skilled in the art from the following specification and from the appended drawings illustrating certain preferred embodiments, in which:

The drawings illustrate an electromagnetic brake 10 comprising a base 12 on which a work receiving means in the form of a brake setting or releasing mechanism 14 is mounted for engagement with a drum or wheel 16. As shown in FIGS. 1–4, the base 12 is formed by a pair of spaced elongated right angle members 18 and 20 that are maintained in parallel spaced relation by plate-like mounting members 22a, b, c and d. The members 22a–d are secured, as by welding at spaced intervals along the rear legs 18a and 20a of the members 18 and 20 respectively so the rear legs 18a and 20a extend in opposite directions and outwardly from the forwardly extending leg portions 18b and 20b of the members 18 and 20 respectively. The members 22a and 22b and the portions of the legs 18a and 20a disposed forwardly of the members 22a and 22b are provided with suitable bolt receiving openings which may be utilized to secure the brake to a support. The members 22c and 22d and portions of their associated legs 18a and 20a are also provided with suitably threaded openings which receive bolts 24 that secure an electromagnet 26 to the base 12.

Figure 1:
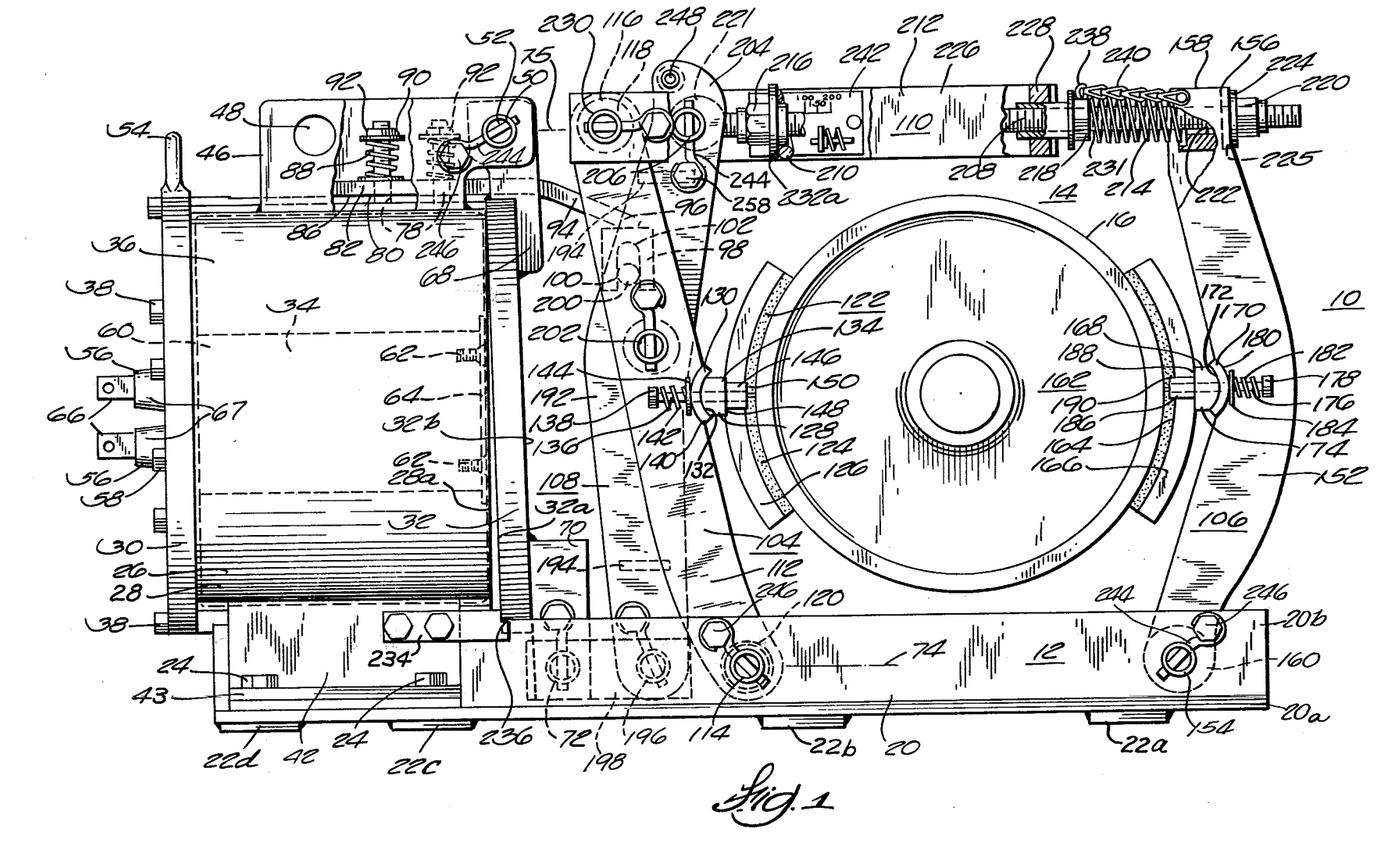
FIG. 1 is an elevational view of an electromagnetic brake incorporating the features of the present invention.
Figure 2:
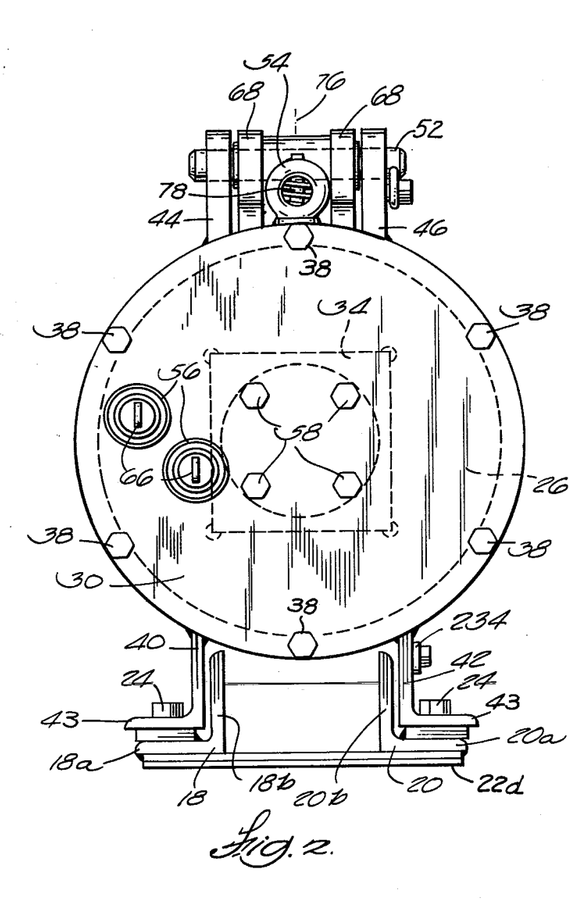
FIG. 2 is a view showing the left end of the brake in FIG. 1.
Figure 3:
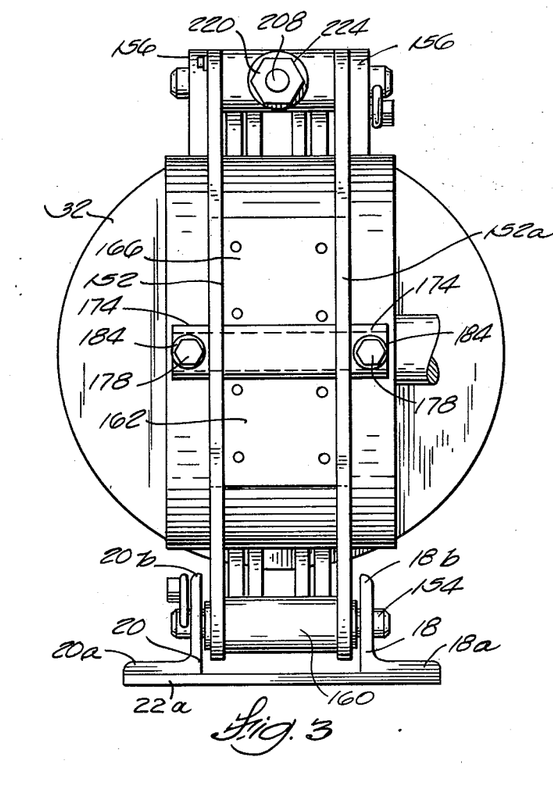
FIG. 3 is a view showing the right end of the brake in FIG. 1.
Figure 4:
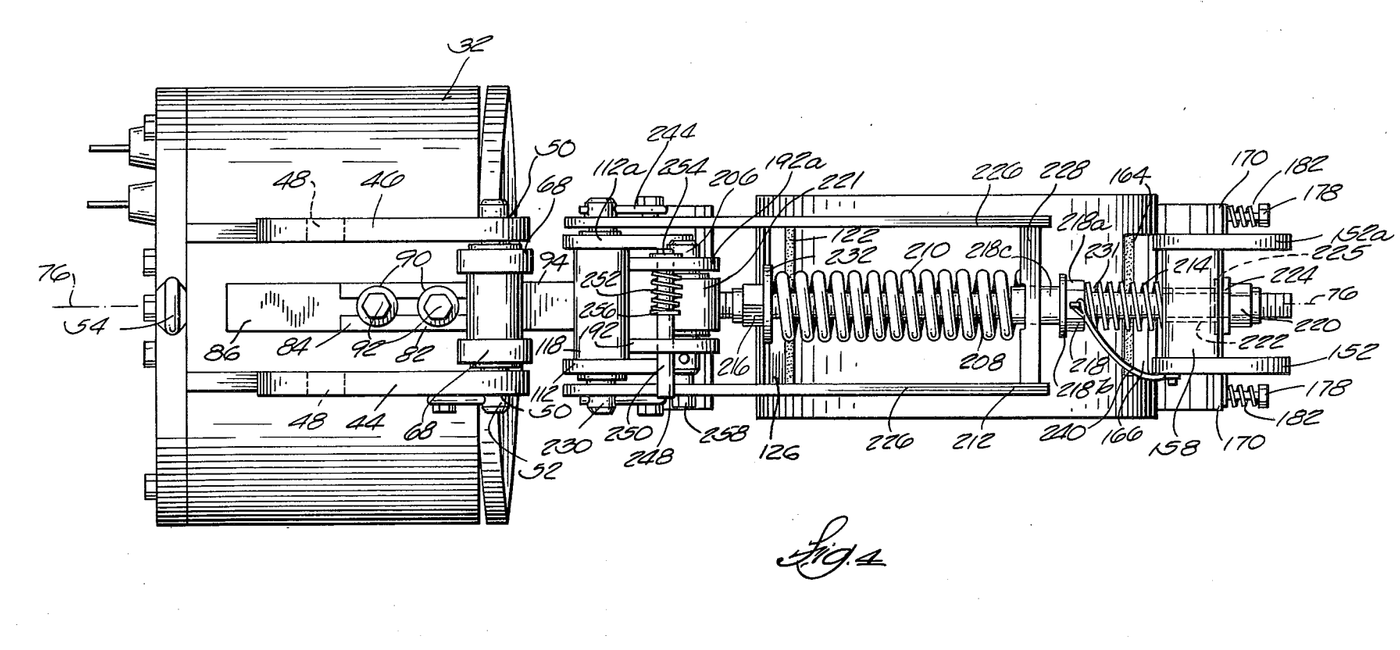
FIG. 4 is a top plan view of portions of the brake shown in FIG. 1.

The electromagnet 26 includes a magnet case 28, a magnet cover 30, a clapper-type armature 32, a magnet core 34 and a magnet coil 36. The magnet case 28 is formed as a hollow cylinder having a wall of a thickness to conduct the necessary magnet flux and have suitably located threaded openings therein to accept bolts 38 which secure the cover 30 to an open left end of the case 28, as illustrated in FIGS. 1 and 2. Secured to a rear side of the case 28 are a pair of spaced elongated right angle mounting feet 40 and 42 which have their respective upper edges welded to the case 28 and are located so their rear flange portions 43 rest upon the legs 18a and 20a where they are secured by the bolts 24. A pair of spaced plates 44 and 46 are secured at the upper surface portions of the case 28 to extend parallel to each other. Each of the plates 44 and 46 has a pair of openings 48 and 50 extending therethrough. The openings 48 in the plates 44 and 46 are aligned along a common axis and are provided to receive a pin, not shown, which may be used when the brake 10 is raised or moved by a hoist. The openings 50 in the plates 44 and 46 are also aligned along a common axis and are provided and located to receive a portion of a hinge pin 52 for the armature 32.

The magnet cover 30 is formed as a circular disc having a diameter equal to the outer diameter of the magnet case 28 and includes suitably located equidistantly spaced openings which receive the bolts 38 that secure the cover 30 to the left end of the case 28. If desired, a suitable lifting hook 54 may be welded to the upper edge of the cover 30. The hook 54 may be used when the electromagnet 26 or the cover 30 is moved by a hoist. In the embodiment shown, the cover 30 has a pair of openings extending therethrough which receive a pair of terminals 56 extending from the left end of the magnet coil 36. Also extending through the cover are four quadrantially spaced openings located equidistantly from the center of the cover 30 which receive bolts 58 that secure the left end of the magnet core 34 to the cover 30.

The magnet core 34 includes a solid metal cylinder 60 having threaded openings at its left end which receive the bolts 58 and an outer cylindrical surface spaced from the inner cylindrical surface of the case 28. Secured at the right cylindrical end of the core 34 by four quandrantially located bolts 62 is a rectangularly shaped metal plate 64 which is received in a rectangular recess in the right end of the coil 36 to maintain the coil 36 against rotation in the case 28 and the left end of the coil 36 in firm engagement with the cover 30.

The magnet coil 36 is preferably formed as an encapsulated cylindrically shaped unit that is positioned in the space between the core 34 and the case 28 and includes encapsulated windings which extend to the pair of terminals 56 having exposed conductor ends 66 which are provided to connect the windings to a suitable electric source. The ends 66 project from tapered post-like projections 67 formed by the encapsulating material of the coil. The projections 67 extend through the pair of openings in the cover 30 so the terminal ends 66 are insulated from the cover and are readily accessible at the left end of the brake 10.

The armature 32 is formed as a circular disc having a diameter equal to the outer diameter of the magnet case 28. The armature 32 has a pair of spaced hinge members 68 welded at its upper end which include openings that receive the pin 52 and locate the armature 32 so that the armature 32 is pivotally mounted at the upper end of the case 28 and movable to a position whereat peripheral portions on the left surface 32a on the disc-like armature 32 co-extensively engage the surface portions 28a on the ring-like right end of the case 28. Also extending downwardly from the rear end of the armature 32 and movable in the space between the leg portions 18b and 20b are a pair of spaced members 70 which are welded to the right face 32b of the armature 32 and have openings therein which are aligned to receive a pivot pin 72.

Centered in a plane designated as 76 that extends perpendicular to the base 12 along the longitudinal central axis of the base 12 and through the center of the core 34 so the plane 76 is the center plane of the brake 10 are a pair of threaded bolts or studs 78 which are threaded into a pair of spaced threaded openings in the front side of the case 28. The studs 78 are aligned in the plane 76 and positioned to the left of the pin 52 to project upwardly from the top or front side of the case 28.

Positioned by the studs 78 at the front side of the case 28 is a centering bracket assembly 80 that includes a centering bracket 82. The centering bracket 82 is formed of a metal part having a bifuracated end 84 including a slot centered in the plane 76 through which the studs 78 extend.

The end 84 is movably positioned on a flat surface 86 on the front side of the case 28, which may be formed by grinding or milling the case, by springs 88 and washers 90 which are positioned between the head or nut 92 on the studs 78 and the front surface on the end 84. The bracket 82 extends from the end 84 through a rearwardly curved portion 94 to an end 96. Secured to the end 96, as by welding, is a pivot member 98. The member includes a rearwardly facing open-ended slot 100 that is centered in and extends perpendicular to the plane 76 and has a hemispherical root portion 102.

The brake mechanism 14 includes an inboard brake shoe assembly 104, an outboard brake shoe assembly 106, an actuating lever assembly 108, and an operating rod assembly 110. The inboard brake shoe assembly 104 includes a pair of parallel lever arms 112 and 112a that extend on opposite sides of the plane 76 from a pivot pin 114. The pin 114 extends through openings in the leg portions 18b and 20b and openings in the rear ends of arms 112 and 112a so the arms 112 and 112a are pivoted on the base 12 and extend forwardly in spaced relation to the left side of the drum 16 to free ends 116 which are located forwardly of the upper surface of the drum 16. The free ends 116 on the arms 112 and 112a are interconnected by a tubular sleeve 118 which is welded to the ends 116. The sleeve 118 is centered in a plane 75 that is perpendicular to the plane 76 and parallel to the base 12. The rear ends of the arms 112 and 112a are interconnected by a tubular sleeve 120 which receives the pivot pin 114. The pin 114 is centered in a plane 74 that extends parallel to the plane 75. The assembly 104 also includes a brake shoe assembly 122 which is mounted intermediate the ends of the arms 112 and 112a. The assembly 122 includes a friction brake lining 124, a brake lining support 126 and a means for mounting the brake lining support 126 on the arms 112 and 112a so the entire braking surface on the brake lining 124 engages a portion of the outer curved surface on the left side of the drum 16. The brake lining 124 and the brake lining support 126 are shaped to present concave surfaces facing the drum 16 which are concentric with the outer surface of the drum 16. The support 126 is preferably formed of metal plate material and the lining 124 of a suitable friction material which is secured to the concave surface of the support 126 as by riveting or bonding. The means for mounting the support 126 on the arms 112 and 112a includes bar-like member 128 which is secured to the outer convex surface of the support 126 to extend perpendicular to the plane 76, an arcuately shaped member 130 secured to the mid portions of the arms 112 and 112a to extend perpendicular to the plane 76 and present a concave surface that is co-extensively engaged by a convex surface 132 on the member 128. The members 128 and 130 are co-extensive in length and provide portions 134 which project beyond the areas on the support 126 and arms 112 and 112a to which the members 128 and 130 are attached. Each of the portions 134 on the members 128 and 130 is provided with an elongated passage extending therethrough which has a vertical dimension greater than the diameter of a bolt 136. A bolt 136 extends through the passages in each of the portions 134 to present a head portion 138 that is spaced from the outer convex surface 140 on its associated member 130. Positioned between the head portion 138 and the surface 140 on each bolt 136 is a compression spring 142 and a washer 144 with the washer 144 located to engage its associated surface 140.

Threadedly engaging portions of each bolt 136 projecting beyond the portions 134 on the member 128 is a nut 146 which has a side engaging a flat surface 148 so that tightening of the nut 146 will compress its associated spring 142 and increase the frictional engagement between the members 128 and 130. The nut 146 preferably is sized so that a surface 150 remote from the flat surface 148 is located along an axis that is spaced between the concave and convex surfaces of the lining 124 so that as the lining wears during service of the brake 12, the surface 150 will move closer to an axis extending along the outer surface of the drum 16 to visually indicate the condition of the lining 124 and when replacement thereof is advisable.

The outboard brake shoe assembly 106 includes a pair of parallel lever arms 152 and 152a that extend on opposite sides of the plane 76 from a pivot pin 154. The pin 154 extends through openings in the leg portions 18b and 20b and openings in the rear ends of arms 152 and 152a so the arms 152 and 152a are pivoted on the base 12 and extend forwardly in spaced relation to the right side of the drum 16 to free ends 156 which are located forwardly of the upper surface of the drum 16. The free ends 156 of the arms 152 and 152a are interconnected by a block-like member 158 which is welded to the ends 156. The rear ends of the arms 152 and 152a are interconnected by a tubular sleeve 160 which receives the pivot pin 154. The assembly 106 also includes a brake shoe assembly 162 which is mounted intermediate the ends of the arms 152 and 152a. The assembly 162 includes a friction brake lining 164, a brake lining support 166 and a means for mounting the brake lining support 126 on the arms 152 and 152a so the entire braking surface on the brake lining 164 engages a portion of the outer curved surface on the right side of the drum 16. The brake lining 164 and the brake lining support 166 are shaped to present concave surfaces facing the drum 16 which are concentric with the outer surface of the drum 16. The support 166 is preferably formed of metal plate material and the lining 164 of a suitable friction material which is secured to the concave surface of the support 166, as by riveting or bonding. The means for mounting the support 166 on the arms 152 and 152a includes bar-like member 168 which is secured to the outer convex surface of the support 166 to extend perpendicular to the plane 76, an arcuately shaped member 170 secured to the mid portions of the levers 152 and 152a to extend perpendicular to the plane 76 and present a concave surface that is coextensively engaged by a convex surface 172 on the member 168. The members 168 and 170 are co-extensive in length and provide portions 174 which project beyond the areas on the support 166 and arms 152 and 152a to which the members 168 and 170 are attached. Each of the portions 174 on the members 168 and 170 is provided with an elongated passage extending therethrough which has a vertical dimension greater than the diameter of a bolt 176. A bolt 176 extends through the passages in each of the portions 174 to present a head portion 178 that is spaced from the outer convex surface 180 on its associated member 170. Positioned between the head portion 178 and the surface 180 on each bolt 176 is a compression spring 182 and a washer 184 with the washer 184 located to engage its associated surface 180.

Threadedly engaging portions of each bolt 176 projecting beyond the portions 174 on the member 168 is a nut 186 which has a side engaging a flat surface 188 so that tightening of the nut 186 will compress its associated spring 182 and increase the frictional engagement between the members 168 and 170. The nut 186 preferably is sized so that a surface 190 remote from the flat surface 188 is located along an axis that is spaced between the concave and convex surfaces of the lining 164 so that as the lining wears during service of the brake 12, the surface 190 will move closer to an axis extending along the outer surface of the drum 16 to visually indicate the condition of the lining 164 and when replacement thereof is advisable.

The actuating lever assembly 108 includes a pair of spaced parallel actuating levers 192 and 192a that extend on opposite sides of the plane 76. The spaced relation between the levers 192 and 192a is maintained by a pair of block-like spacers 194 which have their ends welded to the confronting surface portions on the levers 192 and 192a. The levers 192 and 192a are pivotally connected through a pivot pin 196 and a block-like member 198 to the pivot pin 72. The member 198 has a pair of spaced bores which receive the pins 72 and 196 and is sized to be positioned between the spaced members 70 which extend from the right face of the armature 32 and the levers 192 and 192a. The openings which receive the pins 72 and 196 as well as the pins 114 and 154 are located so all of the pins are centered in the plane 74 when the brake linings 124 and 164 are engaging the drum 16, as will be later described. A pivot pin 200, which acts as a centering pin has its opposite ends secured in suitable openings in the levers 192 and 192a so that the pin 200 extends between the confronting faces of the levers 192 and 192a along an axis which has a predetermined location and arranged so the pin 200 is positioned in the slot 100. Thus the levers 192 and 192a are pivoted by the pin 200 about the pivot member 98. The inboard lever arms 112 and 112a are movably connected to the levers 192 and 192a by a pin 202. The pin 202 extends through openings located intermediate the ends in the arms 112 and 112a and the levers 192 and 192a. The pins 196 and 202 are centered on an axis that extends perpendicular to the plane 74 when the lining 124 is in engagement with the drum 16. Preferably the centering pin 200 and the pin 202 are located so the vertical distance between the center of the pin 200 and the plane 75 is twice the vertical distance between the centers of the pin 202 and the centering pin 200. The levers 192 and 192a extend forwardly from the pivot pins 196 and 200 to free ends 204 which are interconnected by a pivot pin 206. The pin 206 is centered in the plane 75.

The operating rod assembly 110 is located at the top or front of the brake 10 and centered along in the plane 75. The assembly 110 includes a connecting rod 208, an operating spring 210, an operating spring yoke 212, a connecting rod spring 214, a calibrating nut 216, a manual release nut 218, and an adjusting nut 220. The connecting rod 208 in the embodiment shown is threaded along its entire length and has a tubular sleeve 221 attached at its left end which is journalled on the pin 206 and extends through a passage 222 in the block-like member 158 so a portion of the rod 208 extends to the right of the member 158. The passage 222 in the block 158 receives the rod 208 with clearance to permit an angular movement between the levers 152 and 152a and the rod 208. The nut 220 is threaded on the right end of the rod 208 into engagement with a connecting rod washer 224. The washer 224 has a convex surface at its left end which engages a concaved surface on a washer 225 at the right end of the passage 222 to center the rod 208 in the passage 222 and provide for the angular movement between the levers 152 and 152a and the rod 208. The operating spring yoke 212 is formed as a U-shaped part having a pair of parallel arms 226 extending from a bight portion 228. The arms 226 have aligned openings at their left ends which receive a pivot pin 230 that extends between the arms 226 and is journalled in the sleeve 118. The bight portion 228 is provided with a central opening through which the rod 208 extends. The manual release nut 218 is formed to have a tool gripping portion 218a at its right end, a flange portion 218b intermediate its ends which is provided to engage portions of the bight portion 228 surrounding the rod receiving opening, and a sleeve portion 218c at its right end which receives the rod 208 with clearance and is received in the passage in the bight portion 228 to position the bight portion 228 on the rod 208. The connecting rod spring 214 surrounds the rod 208 and is positioned between a spring seat in the block 158 and a spring seat 231 which engages the right side of the nut 218. The operating spring 210 surrounds the rod 208 and has its right end positioned in a spring seat provided by a counterbore surrounding the left of the passage through the bight portion 228. The left end of the spring 210 is positioned against a washer-like spring seat 232, the position of which is dictated by the position of the calibrating nut 216 which is threaded on the rod 208 to axially position the seat 232 on the rod 208.

As previously described, the inboard brake shoe assembly includes a pair of levers 112 and 112a, the outboard brake shoe assembly includes a pair of levers 152 and 152a, the actuating lever assembly includes a pair of levers 192 and 192a and the yoke 212 includes a pair of parallel arms 226. The pairs of levers 112–112a, 152–152a, 192–192a and the arms 226 are interconnected so that each pair acts as a single member. Thus, in the interest of simplification, in the following description the respective pairs will be designated as a single element.

The adjustment of the brake 10 to provide the proper torque output which prevents the drum 16 from rotating when the electromagnet 26 is de-energized, is made as follows. Initially, the optimum air gap between the surface 32a on the armature 32 and the surface 28a on the magnet case 28 is determined experimentally. The size of the proper air gap is permanently indicated on the brake 10 by a metal plate 234 which has a notch 236 aligned with the surface 32a to indicate the optimum air gap when the electromagnet 26 is de-energized. Initially the nut 218 is positioned on the connecting rod 208 so that a cotter pin receiving opening in the nut 218 is aligned with a cotter pin receiving bore in the rod 208 and a cotter pin 238 is inserted in the opening to maintain the nut 218 at its adjusted position on the rod 208. The location of the cotter pin 238 receiving opening in the rod 208 is determined experimentally so that the brake will have the desired operating characteristics. Preferably, the cotter pin 238 is connected through a suitable chain 240 to a fixed portion of the brake 10 to prevent loss of the pin when the cotter pin 238 is removed. After the nut 218 is positioned as indicated, the compressive output force exerted by the operating spring 210 is adjusted by rotating the nut 216 on the operating rod 208 to a position where a surface 232a on the spring seat 232 is aligned with a desired mark on a calibration plate 242. The plate 242 is secured on one of the arms 226 and is located experimentally so that the scale on the plate will indicate the required position of the nut 216 which will cause the linings 124 and 164 to engage the drum 16 with the required pressure to cause the brake to have the desired torque output. The force exerted by the spring 210 also causes the bight portion 228 to be pressed into tight engagement with the flange portion 218b on the nut 218. After the output force of the operating spring 210 is thus adjusted, the adjusting nut 220 is rotated on the operating rod 208 to a position where the armature 32 will be moved to a location where its surface 32a is aligned with the notch 236. The nuts 216 and 220 preferably are of the self-locking type, so that after the nuts are positioned on the rod 208 they will not rotate to upset the calibration of the brake. The rotation of the nut 220 on the rod 208 causes the output arm 152 to rotate about its pivot pin 154 to a position where the lining 164 engages the outer surface of the drum 16. The operating lever 192 is connected through the pin 206 to the connecting rod 208 so that the rotation of the nut 220 causes the operating lever 192 to rotate about its pivot pin 200 in a clockwise direction. The tightening of the nut 220 will also cause the distance between nut 218 and the block-like member 158 to decrease and the yoke 212 to move to the right. The movement of the yoke 212 through the connection provided by the pivot pin 230 causes the lever 112 to rotate in a clockwise direction about pin 114 to a position where the lining 124 engages the drum 16. The lever 112 is connected by the pivot pin 202 to the actuating lever 192 so that when the linings 124 and 164 engage the drum and the nut 220 is positioned to cause the armature to be positioned to have the proper air gap, the force provided by the spring 210 is exerted on the pin 200 and causes centering bracket assembly 80 to move and automatically position the slot 100 at a location where linings 124 and 164 engage the drum 16 with an equal force. The movement of the centering bracket 80 is accommodated by the frictional engagement between the centering bracket 80 and the surface 86 as determined by the compressive force exerted by the springs 88.

The brake shoe assemblies 122 and 162 are respectively mounted on the lever assemblies 104 and 106. The assembly 104 includes members 128 and 130 which have arcuate surfaces engaging one another with a frictional engagement provided by the force of the springs 142. Similarly, the assembly 106 includes members 168 and 170 which have arcuate surfaces in frictional engagement with a force provided by the springs 182. Thus when the linings 124 and 164 are forced into engagement with the outer surface portions of the drum 16 in response to the output force provided by the spring 210, the brake shoe assemblies 122 and 162 will automatically move to positions where the frictional surfaces on the linings 124 and 164 are concentric with the outer surface portions of the drum 16.

After the nuts 216 and 220 have been adjusted on the rod 208 to positions were the proper air gap exists between the armature 32 and the case 28 and the assemblies 104 and 106 are engaging the drum 16 with the proper pressure, as dictated by the setting illustrated by the indicating plate 242, the operation of the electromagnetic brake 10 is as follows. When the electromagnet 26 is de-energized, components of the brake mechanism 14 will be positioned as previously described. The energization of the electromagnet 26 causes the armature 32 to rotate in a clockwise direction about the pin 52 to a position where the surface 32a engages the surface 28a. The clockwise rotation of the armature 32 through the connection provided by the pivot pin 72, the member 198, and the pivot pin 196 causes the actuating lever 192 to rotate in a clockwise direction about the pivot pin 200. The clockwise rotation of the operating lever 192 through the connection provided by the pin 206 causes the operating rod 208 to move to the right along the plane 75 and the outboard brake shoe assembly to rotate about pin 154 in clockwise direction and the lining 164 to move out of engagement with the drum 16 in response to the force exerted by the connecting rod spring 214. The clockwise rotation of the operating lever 192 through the scissors-like connection provided by the pin 202 with the lever 112 also causes the pin 200 to move vertically in the slot 100 and the inboard brake shoe assembly 104 to rotate in a counterclockwise direction about pin 114 and the pivot pin 230 to move to the left along the plane 75. The movement to the left of the pivot pin 230 causes the yoke 212 to move to the left and the spring 210 to be compressed. The movement to the left of the yoke 212 is accommodated by sliding connection between sleeve-like portion 218c and the opening in the bight portion 228 which permits the bight portion 228 to move out of engagement with the flange portion 218b. The counterclockwise rotation of the inboard lever also causes the lining 124 to move out of engagement with the surface portions of the drum 16 so that the drum 16 is free to rotate. As shown, the plate 64 is spaced from the surface 32a of the armature 32 when the electromagnet 26 is energized to prevent residual flux from maintaining the armature 32 in its engaged position after the electromagnet 26 is deenergized. The de-energization of the electromagnet 26 permits the armature 32 to move to its de-energized position whereat the air gap between the surfaces 28a and 32a is re-established. The force which causes the armature 32 to move to its deenergized position and the inboard brake shoe assembly 104 and the outboard brake shoe assembly 106 to move to positions whereat the linings 124 and 164 engage the drum is provided by the operating spring 210. The release of the armature 32 upon the de-energization of the electromagnet 26 permits the spring 210 to exert a force which causes the connecting rod 208 to move to the left and the yoke 212 to move to the right. The movement to the left of the connecting rod 208 causes the outboard brake shoe assembly 106 to rotate in a counterclockwise direction about pivot pin 154 to a position where the lining 164 engages the drum 16 with a force dictated by the previously adjusted torque adjustment as described. The movement to the right of the yoke 212 through the connection provided by the pin 230 causes the inboard brake shoe assembly to rotate in a clockwise direction about pivot pin 114 to a position where the lining 124 engages the drum 16 with a force dictated by the previous torque adjustment of the brake as described. The movement of the operating rod 208 to the right and the movement of the yoke 212 to the left through the connections provided by the pivot pins 206 and 230 with the actuating lever 192 and the lever arm 112 respectively causes the lever 192 and arm 112 to move with a scissors-like action about the pivot pin 202. The scissors-like movement between the lever 192 and arm 112 causes the pivot 200 to move in the slot 100 and the pivot pin 196, the member 198 and the pin 72 to move to the right and the armature 32 to be rotated about its pivot 52 in a counterclockwise position to re-establish the air gap between the armature 32 and the magnet case 26.

As illustrated, each of the pivot pins is maintained against displacement by suitable securing pins which are received in openings in their associated pivot pins. Each of the securing pins is secured in the proper position by means of a bolt which is threaded into openings in the brake so that the securing pins may be removed to provide access to their associated pivot pins when it is desired to remove the pivot pins. One of the pins associated with the pivot pin 52 is designated as pin 224 and its associated bolt is designated as bolt 246, it being understood that the remaining pivot pins in the brake assembly are provided with corresponding pins 244 and bolts 246.

On occasion it may be necessary to remove the drum 16 from its position in the brake mechanism assembly 14. The removal of the drum may be required when the windings of the motor which rotate the drum 16 are burned out. Removal of the drum may be safely accomplished in the following manner.

Initially the nut 220, the washers 224 and 225 and the cotter pin 238 are removed from their positions on the rod 208 so that the outboard brake shoe assembly 106 may be rotated in a clockwise direction about pivot pin 154 to locate the brake shoe assembly 162 in a retracted position where the drum 16 may be moved upwardly without engaging any portion of the assembly 106. The spring 214 is then removed from its position on the rod 208. The nut 218 is then rotated in a direction which permits the bight portion to move to the right as the compressive force on the spring 210 is reduced and the operating rod assembly 110 is manually moved upwardly from its initial centered position in a plane 75. A continued rotation of the nut 218 causes the assembly 110 to move in a counterclockwise direction about the pivot pins 206 and 230 as the centers of the pins 206 and 230 respectively move above and below the plane 75. The manual force may be removed after the assembly 110 moves from its centered position in the plane 75 and the continued rotation of the nut will cause the assembly 110 to rotate in the counterclockwise direction with a gradual controlled movement. When the nut 218 is rotated to a position where the spring 210 is no longer compressed, the inboard brake shoe assembly rotated in a counterclockwise direction about pivot 114 to a retracted position where portions on the yoke 212 engage portions on the electromagnet 26. When the assembly 106 is thus positioned, the drum 16 may be moved upwardly without engaging any portions of the assemblies 106 and 110. During the movement of the assembly 106 to its retracted position, the pin 200 will move vertically downwardly in the slot 100 and the pins 72 and 196 as well as the member 198 will move to the right to cause the armature to rotate in a counterclockwise direction about pin 52.

The components of the brake mechanism 14 may be reassembled after the drum 16 is repositioned in the space between the assemblies 104 and 106 as follows: Initially the nut 218 is rotated to its calibrated position and the assemblies 104, 108 and 110 are rotated in a clockwise direction to positions which cause the assembly 110 to be approximated centered in the plane 75, and the spring 214 is positioned in the rod 208. The assembly 106 is then rotated in a counterclock direction to a position which permits the right end of the rod 208 to extend through the passage 222 and the spring 214 to be seated on its associated spring seats. The washers 225 and 224 are then installed on the right end of the rod in proper position relative to the member 158 and the nut 220 is threaded on the rod 208 to a position where it engages the washer 224 and the linings 124 and 164 engage the drum 16. The cotterpin 238 is installed in the openings in the nut 218 and the rod 208 and the nut 220 is then adjusted to provide the proper air gap between the surfaces 28a and 32a, as previously described. During the assembly of the mechanism 14 as described, the brake shoe assemblies 122 and 162 will automatically move to properly oriented positions relative to the drum 16 and the pin 200, as well as the centering bracket assembly 80, will automaticallymove to their proper positions to cause the linings 124 and 164 to engage the drum with equal pressure, as previously described.

When the nut 218 is used to control the movement of the assembly 110 to provide access to the drum 16 as previously described, the rotation of the nut 218 will cause the assembly 110 to move gradually with a controlled movement relative to the assemblies 104 and 108 to a position where the assembly 110 is substantially aligned with the assembly 108. It is possible that an attempt may be made to disassemble the brake mechanism 14 by removing the cotter pin 238 and rotating the nut 218 to reduce the force exerted by the spring 210 before the nut 220 is removed and the assembly 106 is moved to its retracted position as previously described. When this incorrect procedure is followed, the assembly 110 will tend to move with a snap action about the pivot pins 206 and 230 and could cause injury to the person performing the disassembly operation. Also during reassembly of the brake when the nut 218 is substantially at its calibrated position, the assembly 110 will have a tendency to move through the plane 75 into engagement with the drum 16 and therefore could injure the fingers of the person performing the reassembly. To minimize the possibility of the occurrence of the foregoing, the levers 192 and 192a have their free ends 204 extending forwardly of the arms 226 and a spring biased plunger mechanism is carried by the free ends 204 to have an end portion 248 on a plunger 250 located to be engaged by one of the arms 226 when the center of the assembly 110 is displaced in an upward direction out of the plane 75. In addition to the plunger 250, which has a length less than the spacing between the arms 226 and is positioned in suitably located aligned openings in the ends 204, the mechanism includes a spring 252 and a pair of C-shaped rings 254 and 256. One of the C-rings 254 is received in a groove at the end of the plunger remote from the end 248 and engages an outer surface portion of an arm 226 to permit the plunger 250 to be manually moved in one direction and prevent movement of the plunger 250 in the opposite direction from the position where the C-ring 254 engages its associated arm. The other C-ring 256 is positioned in a groove located intermediate the ends of the plunger 250 and the spring 252 surrounds the plunger 250 and is positioned between the ring 256 and the arm 226 associated with the ring 254 to constantly bias the plunger to the position where the end 248 is located in the path of movement of the said one arm 226. Thus an unexpected movement of the assembly 110 in an upward direction is prevented as during disassembly the plunger 250 must be depressed so that the end 248 is out of the path of movement of the said one arm 226 before the assembly 110 can rotate to its retracted position as previously described. The movement of the assembly 110 toward the drum 16 is limited by a bolt 258 and a nut which secure the securing pin 244 for the pivot pin 206. The bolt 258 is threaded into an opening in the lever 192 and the nut is threaded on the bolt to maintain the associated pin 244 in proper position while a portion of the bolt 258 intermediate the nut and the head of the bolt 258 is located to be engaged by a portion of an arm 226 when the assembly 110 is moved through the plane 75 toward the drum 16 to prevent the fingers of a person from being trapped between the yoke 212 and the drum.

Figure 5:
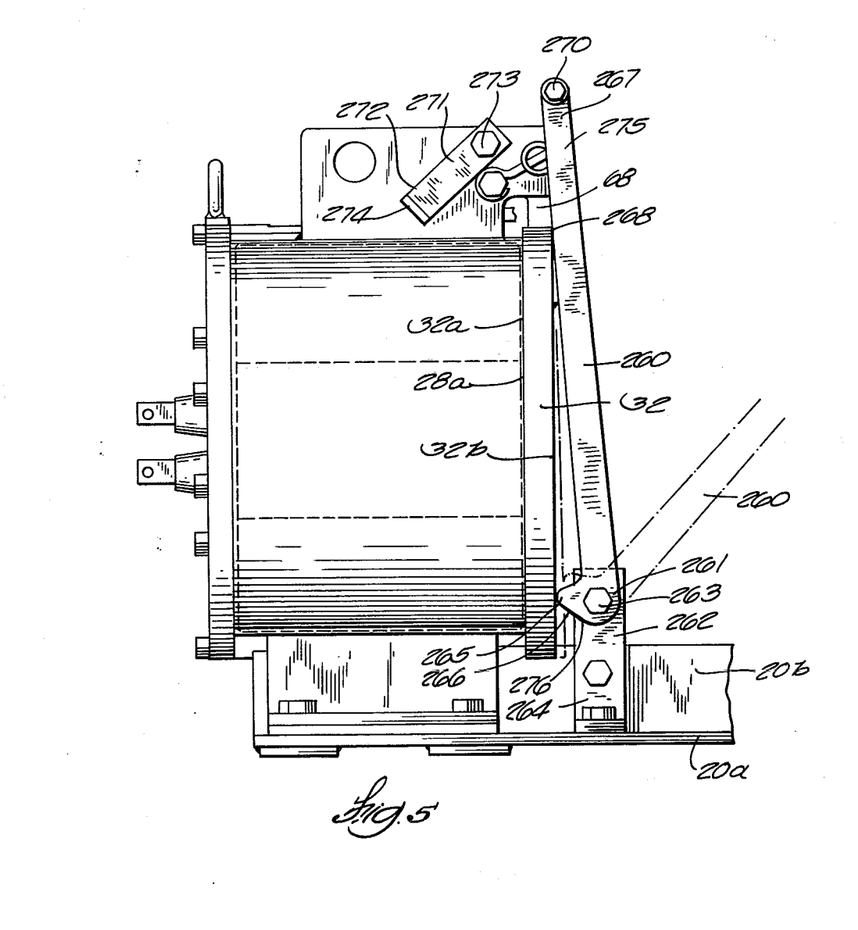
FIG. 5 is an elevational view of a portion of the brake in FIG. 1 incorporating a manual release mechanism.
Figure 6:
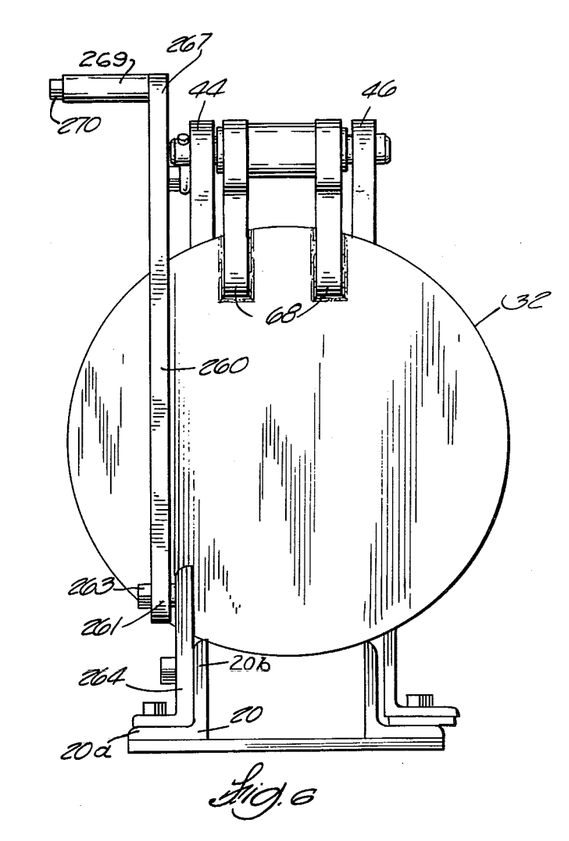
FIG. 6 is an end view of the release mechanism shown in FIG. 5.

If desired, the brake 10 may be furnished with a means for manually operating the brake 10 that will cause the linings 124 and 164 to move and be maintained out of engagement when the magnet 26 is de-energized. As shown in FIGS. 5 and 6, the means for affecting the manual release includes a lever 260 that has an end 261 rotatably mounted on a bracket 262 by a bolt 263. The bracket 262 has a right angle shape having a rear leg portion secured by a bolt to the rear leg 20a and a forwardly extending leg portion 264 secured by a bolt to the leg portion 20b. The leg portion 264 extends forwardly to locate the bolt 263 and the rear end of the lever 260 so a rounded apex portion 265 of a cam surface 266 is in tight engagement with a front surface 32b of the armature 32 when the surface 32a is engaging the surface 28a and the lever 260 is at its activated position as shown in FIG. 5. The lever 260 extends from its end 261 to an end 267 that extends forwardly of the electromagnet 26 while a portion 268 of the lever 260 located between the ends 261 and 267 is positioned against an edge of the armature 32. A handle 269 preferably is secured at the end 267 by a bolt 270 so that the handle may be mounted on either side of the lever 260. If desired, a suitable catch in the form of a rigid angle bracket 271 may be provided to maintain the lever at its activated position. The bracket 271 has a leg portion 272 rotatably mounted by a bolt 273 on one of the plates 44 or 46 and includes a portion 274 which is rotatable between an unlatching position to a latching position where it engages a surface portion 275 on the lever to maintain the lever against displacement from its activated position.

The cam surface 266 extends from the rounded apex 265 to present a surface 276 that extends parallel and spaced from the surface 32b when the lever 260 is moved to its deactuated position. When the lever is at its deactivated position, the end 267 is positioned on a portion of the flange 20a remote from the bracket 262. The manual operating means is actuated by rotating the lever 260 about its pivot on the bracket 262 from its deactivated position to its activated position. During the movement of the lever 260 to its activated position the apex 265 will engage the surface 32b and slide along the surface 32b as the armature 32 moves from a position where the surfaces 28a and 32a are separated to the position where the surfaces 28a and 32a engage each other.

In service the brake 10 is not only used to prevent the rotation of the drum 16 but also to stop the rotation of the drum 16. Thus continued use of the brake 10 will cause the linings 124 and 164 to wear and their thickness to progressively decrease. The progressive wear of the linings 124 and 164 will cause the output force of the spring 210 to progressively decrease and the air gap of the armature to progressively increase, as will now be described. It is obvious that the progressive wear of the linings 124 and 164 will cause the free ends 116 and 156 to progressively move toward each other when the linings 124 and 164 engage the drum 16. The free end 156 on the lever arm 152 is urged to the left in FIGS. 1 and 7 by the spring 210 which is positioned on the seat 232 to constantly urge the seat 232, the rod 208, the free end 156 and the free end 204 to the left along plane 75. The free end 116 on the lever arm 112 is constantly urged to the right along plane 75 by the spring 210 which is seated on the bight portion 228 to urge the free end 116 to the right through the yoke 212. Thus as the linings 124 and 164 wear, the spring seat 232 will move to the left and the bight portion 228 will move to the right to increase the distance between the seats for the spring 210 and decrease the output force of the spring 210 and reduce the force with which the linings 124 and 164 engage the drum 16.

Further it will be seen that as the free end 116 moves to the right, the pivot 202 will also move to the right and cause the centering bracket 80 to move to the right to a position which causes the linings 124 and 164 to engage the drum 16 with equal force as previously described. The movement of the centering bracket 80 to the right and the movement of the free end 204 to the left causes the lever 192 to rotate in a counterclockwise direction about the pin and the armature 32 to rotate in a counterclockwise direction to thereby increase the air gap between the surfaces 28a and 32a.

Figure 7:
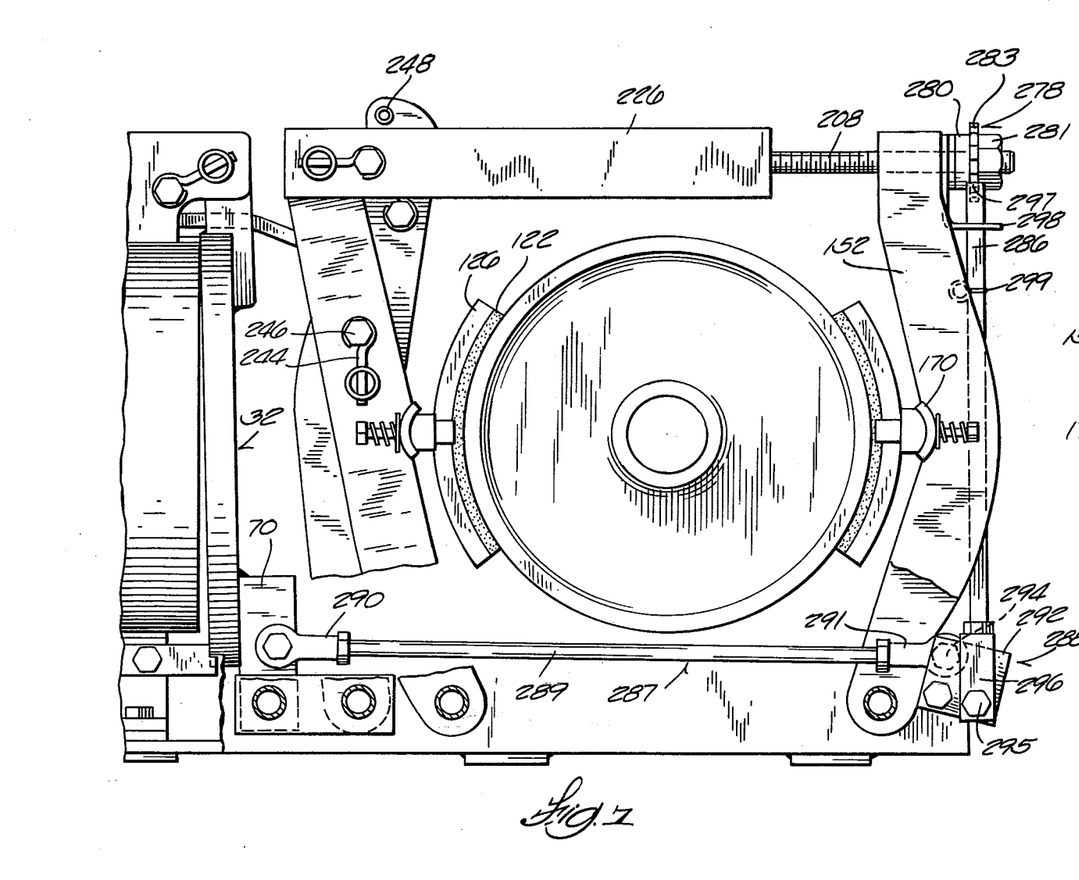
FIG. 7 is an elevational view of the brake in FIG. 1 with portions broken away to illustrate a self-adjusting mechanism to compensate for wear of the brake shoe linings of the brake.
Figure 8:
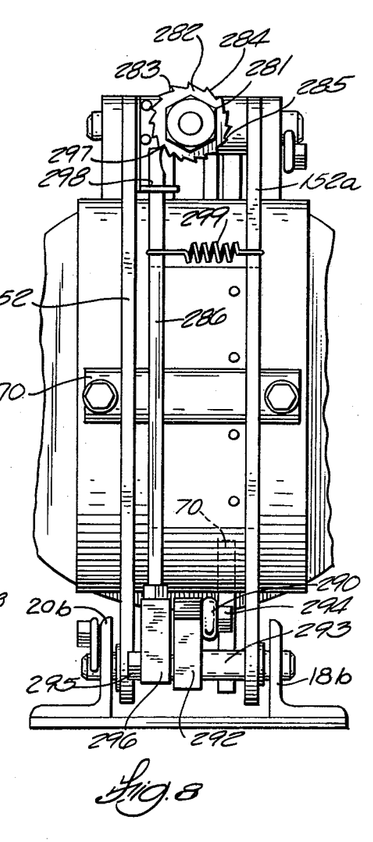
FIG. 8 is an end view of the adjusting mechanism shown in FIG. 7.

If desired, the brake 10 may be provided with a means for automatically changing the operating length of the operating rod 208 when the movement of the armature 32 exceeds a predetermined distance to maintain the distance the brake shoe assemblies 122 and 162 move constant and thereby compensate for the wear of the linings 124 and 164, as will now be described. As shown in FIGS. 7 and 8, in the embodiment including the automatic adjusting means the nut 220 and the connecting rod washer 224 are replaced by a ratchet wheel assembly 278. The assembly 278 preferably is formed as a unitary part that includes a portion 280 having a convex surface at an exposed end complementary with the concave surface of the washer 224 and a tool engaging portion 281 at its other end. Located intermediate the portions 280 and 281 is a ratchet wheel portion 282 having one way ratchet teeth 283. Each ratchet tooth 283 includes an inclined surface 284 that extends to a root portion 285 with the inclined surface 284 having a predetermined length. The ratchet wheel assembly 278 is threaded on the rod 208 and the ratchet teeth 283 are arranged so the assembly 278 is rotated in a tightening direction when the assembly 278 is rotated with a ratchet-like movement in response to the movement of a pawl 286. The pawl 286 is moved vertically by the armature 32 through an actuating rod assembly 287 and a bell crank assembly 288. The actuating rod assembly 287 includes a rod 289 having threaded ends and bearing portins 290 and 291 threaded on opposite ends of the rod 289 so that the operating length of the rod 289 is adjustable. One of the bearing portions 290 is rotatably mounted on one of the plates 70 so the movement of the armature 32 causes a corresponding movement of the rod 289. The other bearing portion 291 is mounted on a block-like member 292. The block-like member 292 is part of the bell-crank assembly 288. The bell crank assembly includes a tubular part 293 that extends between and is rotatably mounted between the parallel leg portions 18b and 20b. The block-like member 292 is secured, as by welding, to an intermediate portion of the part 293 and includes a pair of threaded openings which are located at right angles to the central axis of the part 293. One of the openings receives a bolt 294 which positions the bearing portion 291 on one side of the block 292. The other opening receives a bolt 295 which positions a bearing mount for a block-like part 296. The part 296 is adjustably connected to one end of the pawl 286 so the operating length of the pawl 286 may be varied. The pawl 286 preferably is a rod-like part and extends from the block-like part 296 to a free end which has a pointed tip 297 which is engageable with the root portions 285. The length of the pawl 286 is adjusted so the tip 297 is located along one side of the wheel portion 283 and spaced a predetermined distance rearwardly from the plane 75 when the surfaces 28a and 32a are engaging each other. The movement of the pawl 286 is guided and limited by a plate-like part 298. The part 298 is mounted on the lever 152 rearwardly of the tip 297. The part 298 includes a notch having a side which limits the distance the tip 297 may move in response to the force exerted by a tension spring 299 which extends between the pawl 286 and the arm 152a.

The operation of the means for adjusting the operating length of the rod 208 to compensate for wear of the linings 124 and 164 is as follows. Initially, as previously described, the nuts 218, 220 and 216 are adjusted so that the proper air gap is present between the surfaces 28a and 32a and the linings 124 and 164 engage the drum 16 with the proper force when the electromagnetic 26 is de-energized. When the brake 10 is provided with an adjusting mechanism, as described, the nut 220 is replaced by the ratchet wheel assembly 278 which is positioned on the rod 208 to duplicate the adjustment provided by the replaced nut 220. The operating rod 289 has one end connected to the armature 32 through the bearing portion 290. Thus each time the armature is energized, the rod will move to the left and cause the bell crank assembly 288 to rotate in a counterclockwise direction about the central axis of the tubular part 293. The counterclockwise rotation of the bell crank assembly 288 causes the pawl 286 to move upwardly. When the operating lengths of the operating rod 289 and the pawl 286 are properly adjusted, the forward upward movement of the pawl 286 will cause the tip 297 on the pawl 286 to move over the surface 284 on the wheel portion 282 without engaging a root portion 285 so the position of the ratchet wheel assembly 278 on the rod 208 remains unchanged. The subsequent de-energization of the electromagnet 26 causes the armature 32 and rod to move to the left and the bell crank assembly 288 to rotate in a clockwise direction. The clockwise rotation of the bell crank assembly causes a downward movement of the pawl 286. If the position of the assembly 278 on the rod 208 is proper during the energization and de-energization of the electromagnet 26, the tip 297 will move downwardly over the same surface 284 over which it moved when the electromagnet 26 was energized and the position of the assembly 278 on the rod 208 will not be changed.

As was previously described, a progressive wear of the linings 124 and 164 causes a progressive increase in the required movement of the armature 32 from its de-energized to its energized positions. The progressive increase in movement of the armature 32 is translated through the rod 289 and the bell crank assembly 288 to the pawl 286. When the wear of the linings 124 and 164 has progressed to the extent which requires that the position of the assembly 278 on the rod 208 be changed to maintain the torque output of the brake 10 constant, the increased movement of the armature 32 causes a corresponding increase in the reciprocal movement of the pawl 286. Thus when the armature 32 moves to its energized position, the tip 297 will move across the same surface 284 which it engaged when the armature 32 moved to its de-energized position during the preceding energization and de-energization of the electromagnet 26. However, when the armature moves to its de-energized position, the movement of the pawl 286 in a rearward direction will be sufficient to cause the tip 297 to move downwardly and out of engagement with the surface 284 and move with a tilting-like movement beneath the root portion 285 of the adjacent ratchet tooth 283 located in a counterclockwise direction in FIG. 8. The tilting-like movement of the tip 297 into a position beneath the root portion when the armature 32 is at its de-energized position is caused by the spring 299 which causes the pawl 286 to rotate about a loose pivotal connection between the pawl 286 and the member 292. Thus as the armature 32 moves to its de-energized position, the tip 297 will move out of engagement with the surface 284 associated with one ratchet tooth 283 and into engagement with the root portion 285 of an adjacent ratchet tooth 283. The tip 297 is thus positioned so that a subsequent movement of the armature 32 to its energized position causes the pawl 286 and tip 297 to move upwardly. The upward movement of the tip 297 causes the ratchet wheel assembly 278 to rotate in a direction which decreases the operating length of the rod 210 and thereby re-establishes the adjustment of the brake 10 as previously described.

From the foregoing it is obvious that the brake 10 as described is characterized by the ease with which it may be adjusted and serviced as follows. When replacement of the magnet coil 36 is necessary, all that is required is to disconnect the connections to the terminals 66 and remove the six bolts 38 so that the magnet coil 36 and core 34 may be removed as a unit when a suitable lifting force is applied to the hook 54. When replacement of the entire electromagnetic 26 is necessary, all that is required is to remove the connections to the terminals 66, remove the pin 72 and the four bolts 24 so that the entire electromagnet 26 may be raised vertically by use of the hook 54 or the openings 48 as the connection provided by the slot 100 and pin 200 permits removal of the electromagnet 26 without disturbing any of the components of the brake mechanism 14. All adjustments for the brake including the nuts 92, 216, 218 and 220 are readily accessible at the top or front of the brake 10. Replacement of the brake linings 124 and 164 may be easily accomplished by moving the armature 32 to its energized position by either energizing the electromagnet 26 or moving the armature 32 manually as previously described to cause the linings 124 and 164 to move out of engagement with the drum 16. With the linings thus positioned, removal of the nuts 146 and 186 will permit the bolts 136 and 176 to be removed so that the brake assemblies 122 and 162 respectively may be moved with a sliding motion from their positions on their associated lever arms 112 and 152. The linings 124 and 164 are replaced by reversing the procedure by which they were removed. It is to be noted that no adjustment of the position of the replacement brake shoe assemblies is required as the movable connection provided by the members 128-130 and 168-170 causes the brake linings 124 and 164 to be automatically moved to their proper positions when they initially engage the brake drums. Further, when the linings 124 and 164 initially engage the drum 16, the centering bracket 82 will automatically move to a position which will cause the linings 124 and 164 to engage the drum with equal force and when the brake 10 is energized will cause the linings to move equal distances from their engaging positions with the drum 16. The equal travel of the linings results from the spacing between the pins 200 and 202, the pin 200 and the plane 75. It will be seen that when the pin 202 moves to cause the release of the lining 124 from its position on the drum 16, the distance the pin 206 moves will be twice the distance the pin 202 moves because the distance between pin 206 and the pin 200 is twice the distance between the pins 200 and 202. However, as the pin 202 is located substantially at the center of the lever 112 and the pin 206 is mechanically connected to the free end 156 of the lever 152 which is twice as far from its associated pivot 154 as the distance between the pivots 202 and 114, the distance moved by the linings 124 and 164 will be substantially equal when the brake 10 is energized.

In the preferred embodiment described as shown in the drawings, the electromagnet 26 acts as an energizable operating means and the armature acts as an operating member that provides the necessary force to move the brake shoe assemblies 104 and 106 to their respective second positions when the electromagnet 26 is energized and the armature 32 is moved to an energized position. It will be obvious to those skilled in the art that the electromagnet 26 and the armature 32 may be replaced by other well known operating means that includes a movable operating member which is operatively connected to the operating lever assembly 108 to cause the movement of the brake shoe assemblies 104 and 106 as described. Devices which may be used to act as an operating means instead of the electromagnet 26 as described include pneumatic or hydraulically operated units, electric motors or electromagnets having dual separately excited coil windings. When these type devices are used in the brake mechanism 14 the movement of their respective operating members may be controlled to cause the brake shoe assemblies 104 and 106 to move to their respective fully engaging and disengaging positions relative to the drum 16 as described, or to move at a controlled rate so the brake mechanism 14 acts as a variable torque brake as known in the art.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. A brake assembly for controlling rotative movement of a brake drum comprising: a base, a pair of spaced pivots on the base, a first brake arm extending upwardly of the base and having an end pivoted on a first of said pair of pivots and a free end remote from the pivoted end, a second brake arm extending upwardly of the base in spaced relation to the first brake arm and having an end pivoted on a second of said pair of pivots and a free end remote from the pivoted end spaced from the free end on the first arm, a brake drum positioned forwardly of the base between the first and the second arms, a first and a second brake shoe pivotally mounted intermediate the ends of the first and second arms respectively to frictionally engage outer surface portions of the drum when the free ends of the first and the second arms are moved toward each other to a first position and to move out of the frictional engagement and release the drum for rotation when the free ends on the first and second arms move away from each other to a second position, an actuating lever having a first end movable along a portion of an axis extending through the spaced pivots and positioned external of the space between the pair of pivots, said actuating lever extending from the first end upwardly of the base to a free end that is movable in the space between the free ends on the first and the second arms, a rotatable connection between the first arm and the actuating lever located between the mounting portion for the first brake shoe and the free end of the first arm, an operating rod pivotally interconnecting the free ends of the actuating lever and the second arm, a member having a first end pivotally connected to the free end of the first arm and extending to a second portion that is spaced between the free ends of the first and the second arms, a first spring reacting between the rod and the member constantly urging the first and the second arms toward their respective first positions, a pivot for the actuating lever spaced a predetermined distance from the connection between the first arm and actuating lever and the connection between the operating rod and the actuating lever, yieldable means automatically positioning the pivot for the actuating lever at a position which causes the first and the second brake shoes to simultaneously engage the brake drum during movement of the first and second arms from their respective second to first positions, and an energizable operating means having an operating member operatively connected to the operating lever for causing the first and second arms to move to their respective second positions when the operating means is energized and the operating member moves from a de-energized to an energized position.

2. The brake assembly as recited in claim 1 including means responsive to the movement of the operating member from the de-energized to the energized position for automatically changing the operating length of the operating rod when the operating member movement exceeds a predetermined distance for maintaining the distance the brake shoes move constant and thereby compensate for wear of the brake shoes.

3. The brake assembly as recited in claim 1 wherein the operating means is a clapper type electromagnet having an armature mounted on a pivot that is located along an axis passing through the pivots at the free ends of the first brake arm, the second arm and the operating lever, and said assembly includes a link pivotally connecting the armature to the first end of the actuating lever through pivots that are aligned on the axis through the spaced pivots.

4. The brake assembly as recited in claim 1 including manually operable means for moving and maintaining the operating member at its energized position when the operating means is de-energized.

5. The brake assembly as recited in claim 1 wherein the first brake arm, the second brake arm, and the actuating lever are formed by a pair of parallel spaced members and the pivots at the ends of the arms and lever extend between the associated members of the arms and the lever.

6. The brake assembly as recited in claim 1 wherein the operating rod is threaded substantially along its entire length, the member has a U-shape having a pair of parallel arms pivoted on the free end of the first arm and an opening on a bight portion extending between the parallel arms receiving the threaded rod, the spring surrounds a threaded portion of the rod and is positioned between the bight portion and a spring seat including a first nut that is threaded on a portion of the rod extending between the bight portion and the pivot on the free end of the actuating lever, the second connection between the rod and the second arm includes a bore at the free end of the second arm through which a free end portion of the rod extends, a second nut threaded on the free end of the rod to adjustably position the free end of the second arm on the rod, a second spring surrounding the rod constantly urging the free end on the second arm into engagement with the second nut and including a third nut threaded on the rod and positioned between the second spring and bight portion to engage the bight portion for positioning the bight portion on the rod.

7. The brake assembly as recited in claim 1 wherein the yieldable means which positions the pivot for the actuating lever includes a metal part having a portion slidably positioned on a housing portion of the operating means by a spring to permit movement of the metal part including the pivot to a position which causes the brake shoes to simultaneously engage when the first and second brake arms move toward the first position.

8. The brake assembly as recited in claim 6 including means responsive to the movement of the operating member from the de-energized to the energized position for automatically changing the threaded position of the second nut on the rod when the operating member movement exceeds a predetermined distance for maintaining the distance the brake shoes move constant and thereby compensate for wear of the brake shoes.

9. The brake assembly as recited in claim 5 wherein the first and the second brake shoes are individually pivotally mounted on the first and second brake arms respectively through a connection including a support member connected between the parallel members of its associated brake arm and presenting an elongate concave surface facing its associated side of the drum, a supported member connected at a mid portion of the brake shoe and having an elongated convex surface in frictional engagement with the concave surface of its associated support member and resilient means reacting between the support member and the supported member for adjustably maintaining the frictional engagement between the members in relative positions which positions the associated brake shoe in a proper alignment with the brake drum.

10. The brake assembly as recited in claim 9 wherein the support member and the support members have portions extending outwardly from the external sides of the parallel arms and each portion includes an elongated opening, each brake shoe has a brake lining secured to a backing member with said linings having a predetermined thickness and a surface engageable with the drums and said resilient means includes a bolt extending through each of the elongated openings, a spring reacting between the support member and a head of the bolt and a nut threaded on the bolt to engage the supported member, said nut having a preselected thickness and positioned by the supported member so a surface portion on the nut is positioned to indicate replacement of the linings is requird as wear of the lining causes the nut surface portion to be positioned relative to the drum to indicate the replacement is required.

11. The brake assembly as recited in claim 6 wherein removal of the second nut from its threaded position on the rod permits the second arm to be rotated about its pivot from its first position past its second position to a third position and the rod and member to rotate upwardly about their respective pivots on the actuating lever and first arm to an upright position relative to the base as the first arm moves from its first position past its second position to a third position to permit the drum to be replaced as the drum is moved upwardly from its position between the brake shoes without hinderance from the brake shoes and the rod and member.

12. The brake assembly as recited in claim 11 wherein the upward rotation of the rod and member is controlled as the second nut is rotated on the rod in a direction which causes the compressive force on the first spring to be reduced.

13. The brake assembly as recited in claim 12 in manually operable releasable means for preventing unexpected movement of the rod and member to their respective upright positions after the second arm is rotated to its third position and a manual force is applied to move the rod and member toward their respective upright positions.

14. The brake assembly as recited in claim 13 including means for limiting movement of the rod and member in a downwardly direction toward the drum when the second arm is at its third position and a manual force is applied to move the rod and member toward the drum.

15. A brake assembly for controlling rotative movement of a brake drum comprising: a base, a pair of spaced pivots on the base, a first brake arm extending upwardly of the base and having an end pivoted on a first of said pair of pivots and a free end remote from the pivoted end, a second brake arm extending upwardly of the base in spaced relation to the first brake arm and having an end pivoted on a second of said pair of pivots and a free end remote from the pivoted end spaced from the free end on the first arm, a brake drum positioned forwardly of the base between the first and the second arms, a first and a second brake shoe pivotally mounted intermediate the ends of the first and second arms respectively to frictionally engage outer surface portions of the drum when the free ends of the first and the second arms are moved toward each other to a first position and to move out of the frictional engagement and release the drum for rotation when the free ends on the first and second arms move away from each other to a second position, an actuating lever having a first end movable along a portion of an axis extending through the spaced pivots and positioned external of the space between the pair of pivots, said actuating lever extending from the first end upwardly of the base to a free end that is movable in the space between the free ends on the first and the second arms, a rotatable connection between the first arm and the actuating lever located between the mounting portion for the first brake shoe and the free end of the first arm, an operating rod pivotally interconnecting the free ends of the actuating lever and the second arm, a member having a first end pivotally connected to the free end of the first arm and extending to a second portion that is spaced between the free ends of the first and the second arms, a first spring reacting between the rod and the member constantly urging the first and the second arms toward their respective first positions, a pivot for the actuating lever spaced a predetermined distance from the connection between the first arm and actuating lever and the connection between the operating rod and the actuating lever, yieldable means automatically positioning the pivot for the actuating lever at a position which causes the first and the second brake shoes to simultaneously engage the brake drum during movement of the first and second arms from their respective second to first positions, and an electromagnet having an armature operatively connected to the operating lever for causing the first and second arms to move to their respective second positions when the electromagnet is energized and the armature moves from a de-energized to an energized position.

* * * * *